(12) United States Patent
Hirota (10) Patent No.: US 10,048,534 B2
(45) Date of Patent: Aug. 14, 2018

(54) DISPLAY DEVICE

(71) Applicant: Japan Display Inc., Minato-ku (JP)

(72) Inventor: Takenori Hirota, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/349,589

(22) Filed: Nov. 11, 2016

(65) Prior Publication Data

US 2017/0139274 A1 May 18, 2017

(30) Foreign Application Priority Data

Nov. 13, 2015 (JP) ................................. 2015-223215

(51) Int. Cl.
| | |
|---|---|
| *F21V 8/00* | (2006.01) |
| *G02F 1/1343* | (2006.01) |
| *G02F 1/1368* | (2006.01) |
| *G02F 1/1335* | (2006.01) |
| *G02F 1/1333* | (2006.01) |
| *G02F 1/1339* | (2006.01) |
| *G02F 1/1362* | (2006.01) |
| *G02F 1/1337* | (2006.01) |

(52) U.S. Cl.
CPC ...... *G02F 1/133528* (2013.01); *G02F 1/1339* (2013.01); *G02F 1/1362* (2013.01); *G02F 1/13338* (2013.01); *G02F 1/133723* (2013.01); *G02F 2001/133302* (2013.01); *G02F 2001/133368* (2013.01)

(58) Field of Classification Search
CPC ............... G02F 2001/133368; G02F 1/133723
See application file for complete search history.

(56) References Cited

U.S. PATENT DOCUMENTS

| | | | | |
|---|---|---|---|---|
| 2012/0280373 A1* | 11/2012 | Feng | ................... | H01L 29/4908 257/649 |
| 2014/0132148 A1* | 5/2014 | Jang | ................... | H01L 51/5256 313/504 |
| 2014/0232952 A1 | 8/2014 | Watanabe et al. | | |

FOREIGN PATENT DOCUMENTS

| | | |
|---|---|---|
| JP | 2013-235196 | 11/2013 |
| JP | 2014-157311 | 8/2014 |

* cited by examiner

*Primary Examiner* — Nimeshkumar Patel
*Assistant Examiner* — Jacob R Stern
(74) *Attorney, Agent, or Firm* — Oblon, McClelland, Maier & Neustadt, L.L.P.

(57) ABSTRACT

According to one embodiment, a display device includes a first substrate including a pixel circuit, a second substrate disposed opposite to the first substrate, an optical element layer disposed between the first substrate and the second substrate, and a polarizer disposed between the second substrate and the optical element layer, wherein the second substrate has strength greater than that of the first substrate, and the second substrate constitutes the outermost substrate.

19 Claims, 7 Drawing Sheets

DISPLAY DEVICE

CROSS-REFERENCE TO RELATED APPLICATIONS

This application is based upon and claims the benefit of priority from Japanese Patent Application No. 2015-223215, filed Nov. 13, 2015, the entire contents of which are incorporated herein by reference.

FIELD

Embodiments described herein relate generally to a display device.

BACKGROUND

In recent years, liquid crystal panels and organic electroluminescent (EL) panels are used in commercially available display devices such as liquid crystal monitors, liquid crystal televisions, feature phones, smartphones, tablets, electronic books, and notebook personal computers in terms of eco-friendliness such as space saving or electric power saving. Such a display device includes a pair of substrates which are disposed so as to interleave an optical element layer and a protection member such as a cover glass located on the outer surface of the substrate which is disposed in the viewer side.

Recently, there is strong need for highly thin display devices. To achieve such highly thin display devices, there is a technique to perform mechanical polishing or chemical polishing using, for example, hydrofluoric acid to the pair of substrates opposed to each other.

DETAILED DESCRIPTION

In general, according to one embodiment, a display device includes a first substrate including a pixel circuit, a second substrate disposed opposite to the first substrate, an optical element layer disposed between the first substrate and the second substrate, and a polarizer disposed between the second substrate and the optical element layer, wherein the second substrate has strength greater than that of the first substrate, and the second substrate constitutes the outermost substrate.

Embodiments will be described hereinafter with reference to the accompanying drawings. Throughout the embodiments, common structural elements are referred to by the same reference numbers and description considered redundant will be omitted. Figures are illustrated schematically for better understanding of the embodiments, and the widths, thicknesses, shapes, ratios, etc. of the figures may be different from the actual modes.

In the following description, a liquid crystal display device including a liquid crystal layer as an optical element layer will be used as an example of the display device.

First Embodiment

Figure 1:
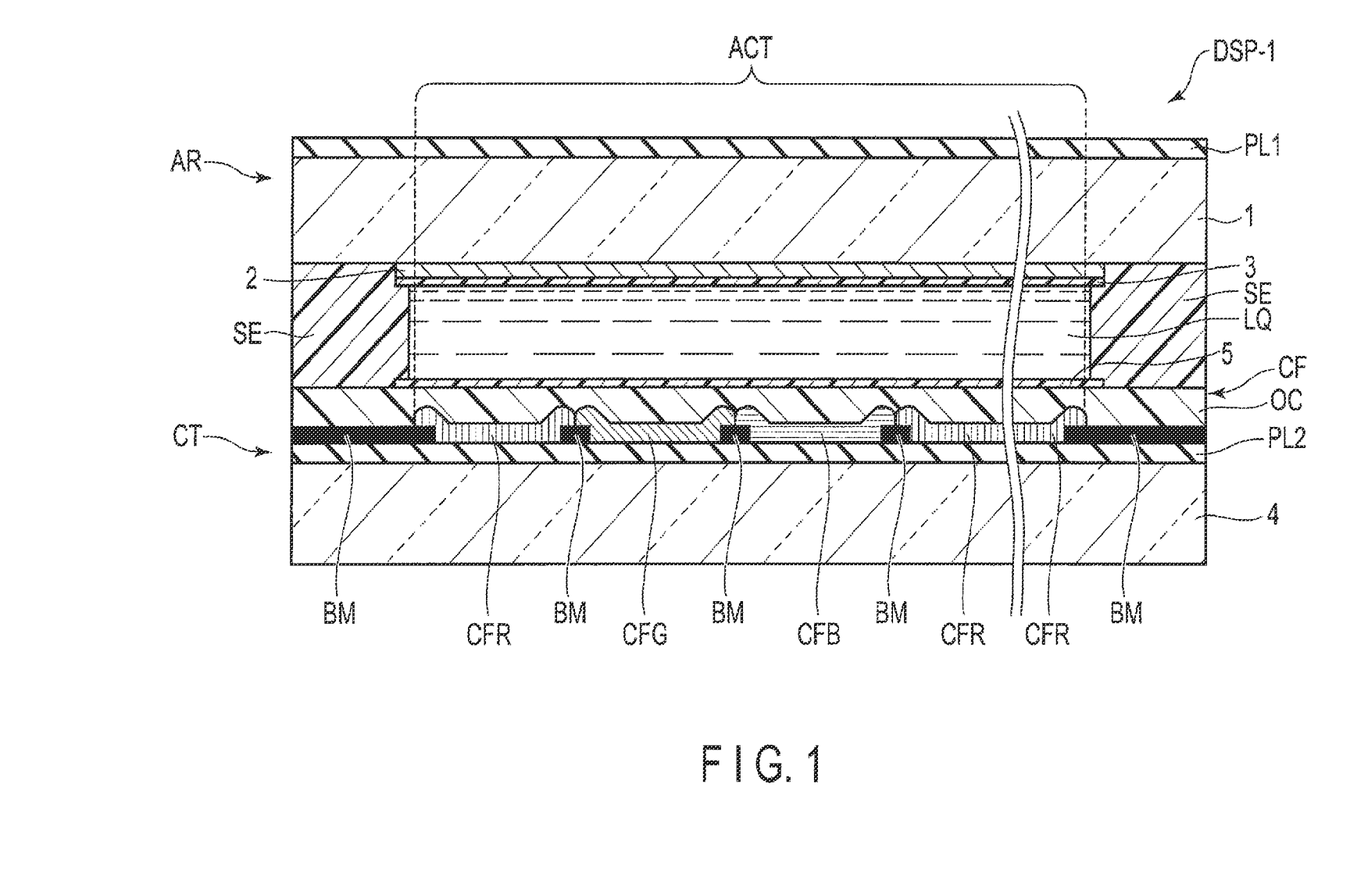
FIG. 1 is a partly omitted schematic cross-sectional view of a display device according to a first embodiment.

FIG. 1 is a schematic cross-sectional view of a display device DSP-1 according to the first embodiment.

The display device DSP-1 is an active matrix liquid crystal display device of horizontal field drive mode. The display device DSP-1 includes an array member AR, counter member CT, and liquid crystal layer LQ which is an optical element layer interposed between the array member AR and the counter member CT. The display device DSP-1 includes an active area ACT for image display within the area surrounded by a sealing material SE which will be described later. The active area ACT is a substantial rectangle in a plan view, and is composed of a plurality of pixels arranged in a matrix. Note that the active area ACT may be formed in a different polygonal shape and its edges may be curved.

The array member AR includes a first substrate 1. The first substrate 1 is a transparent insulating substrate and can be formed of a glass material generally used in an array member. The first substrate 1 is, preferably, an alkali-free glass substrate to prevent the ingress of ionic substances into a thin film transistor (TFT) in a pixel circuit layer 2 which will be described later. The thickness of the first substrate 1 should be adjusted to fit in the size of the display device. The thickness is, preferably, less than 0.3 mm, or more preferably, 0.05 to 0.2 mm.

A first polarizer PL1 is provided with a surface of the first substrate 1, which is the opposite surface to the surface in the liquid crystal layer LQ side. The first polarizer PL1 polarizes light from a light source (which is not illustrated) to a particular direction to be incident on the liquid crystal layer LQ.

Furthermore, a pixel circuit layer 2 is formed on the surface of the first substrate 1 in the liquid crystal layer LQ side. The pixel circuit layer 2 includes pixel electrodes, scanning lines, signal lines, TFTs. Since the display device DSP-1 is a display device of horizontal field drive mode, the pixel circuit layer 2 includes counter electrodes. Each counter electrode is insulated from the pixel electrodes. The pixel circuit layer 2 can be formed by a public knowledge method which the counter electrodes, pixel electrodes, scan lines, signal lines, TFTs can be formed. The pixel electrode can be made of a light transmissive conductive material such as indium tin oxide (ITO) or indium zinc oxide (IZO) or of a light reflective conductive material such as Ag, Al, or Al alloy. The counter electrode can be made of a light transmissive conductive material such as ITO or IZO.

A first alignment film 3 is formed on the surface of the pixel circuit layer 2, which is opposed to the liquid crystal layer LQ. The first alignment film 3 can be formed by a public knowledge method. The first alignment film 3 can be formed by, for example, applying an organic material such as polyimide on the surface of the pixel circuit layer 2 to be an organic thin film and irradiating ultraviolet thereon. Here, rubbing by a rubbing cloth may be used instead of the irradiation of ultraviolet to form the alignment film.

The array member AR is composed of the first substrate 1, the first polarizer PL1, the pixel circuit layer 2, and the first alignment film 3.

The counter member CT includes a second substrate 4. The second substrate 4 is disposed opposite to the first substrate 1. The second substrate 4 is a transparent insulating substrate. The second substrate 4 has strength greater than the first substrate 1. The second substrate 4 is, preferably, a reinforced glass substrate, reinforced plastic substrate, or sapphire substrate, for example. The second substrate 4 preferably has a bending resistance which is greater than that of the first substrate 1. Furthermore, the second substrate 4 preferably has hardness greater than that of the first substrate 1. The second substrate 4 has, more preferably, Vickers hardness greater than that of the first substrate 1. The thickness of the second substrate 4 should be adjusted to fit the size of the display device to which the second substrate 4 is applied. The thickness is, preferably, 0.3 mm or more, more preferably, 0.4 mm to 1.0 mm.

A reinforced glass material for the second substrate 4 is, preferably, a chemically reinforced glass including alkaline metal ion such as sodium ion or potassium ion introduced by an ion exchange method.

A reinforced plastic for the second substrate 4 is, preferably, a fiber reinforced plastic including a reinforcing material such as glass fiber.

The second substrate 4 is disposed at the outermost. Here, the substrate is a plate body made of glass or resin, which supports and/or arranges other structural member. Furthermore, an outer side is the side where a viewer stands, and an inner side is the opposite side of the outer side.

A second polarizer PL2 is disposed on the surface of the second substrate 4 to be opposed to the liquid crystal layer LQ. Here, the second polarizer PL2 can be given disposed in the outer side of the second substrate 4, that is, on the surface of the second substrate 4 which is opposite to the surface opposed to the liquid crystal layer LQ. In that case, however, the second polarizer PL2 may possibly be scratched or contaminated. Therefore, a protection member is required on the outer side of the second polarizer PL2 to prevent such a scratch or contamination. As a result, the whole thickness of the display device increases by the thickness of the protection member. In the display device DSP-1 of the present embodiment, the second polarizer PL2 is disposed in the inner side surface of the second substrate 4, and thus, such a protection member is not required and the thickness of the display device can further be thinned.

A color filter CF is disposed on the surface of the second polarizer PL2, which is opposed to the liquid crystal layer LQ. The color filter CF includes a black matrix BM, color resists CFR, CFG, and CFB, and overcoat layer OC.

In the color filter CF, color resists CFR, CFG, and CFB (subpixels) corresponding to red (R), green (G), and blue (B) are arranged, periodically. A pixel is composed of three subpixels of red, green, and blue.

The black matrix BM is arranged to fit between the red, green, and blue color resists CFR, CFG, and CFB. The black matrix BM is formed in a lattice in a plan view. Thus, the black matrix BM divides the red, green, and blue color resists CFR, CFG, and CFB and prevents color mixture in adjacent color resists.

The overcoat layer OC is disposed to cover the color resists CFR, CFG, and CFB, and the black matrix BM to smooth the unevenness on the surface thereof.

A second alignment film 5 is disposed on the surface of the color filter CF which is opposed to the liquid crystal layer LQ. The second alignment film 5 can be formed by a public knowledge method as an alignment film forming method. The second alignment film 5 can be formed by, for example, applying polyimide or the like on the color filter CF to be a thin organic film and irradiating ultraviolet on the thin organic film. Alternatively, rubbing by a rubbing cloth may be used instead of the irradiation of ultraviolet to form the alignment film.

The counter member CT is composed of the second substrate 4, second polarizer PL2, color filter CF, and second alignment film 5.

The array member AR and the counter member CT are adhered together with a certain cell gap formed therebetween by a sealing material SE (adhesive layer). The cell gap is formed by columnar spacers (which are not shown) on the array member AR or the counter member CT.

The liquid crystal layer LQ is maintained inside the area surrounded by the sealing material SE in the cell gap between the array member AR and the counter member CT. Furthermore, the liquid crystal layer LQ is held by the first alignment film 3 and the second alignment film 5. Note that a method of forming the liquid crystal layer LQ will be described later.

As above, the second substrate 4 structures the outermost substrate of the display device DSP-1. Therefore, any other substrate such as a cover glass used in conventional display devices can be omitted in the display device DSP-1.

In conventional display devices, a cover glass is provided with the outer side of the counter member CT to secure sufficient strength. In the display device DSP-1 according to the present embodiment, the second substrate 4 has the strength greater than that of the first substrate 1 to secure the sufficient strength without providing any additional substrate such as a cover glass on the outer side surface of the counter member CT. Therefore, the number of substrates used can be reduced, and the display device DSP-1 can be made thinner than conventional display devices.

Furthermore, since the second polarizer PL2 is provided with the inner side surface of the second substrate 4, any additional protection member is not required to protect the second polarizer PL2 and the display device DSP-1 can further be made thinner.

Second Embodiment

Figure 2:
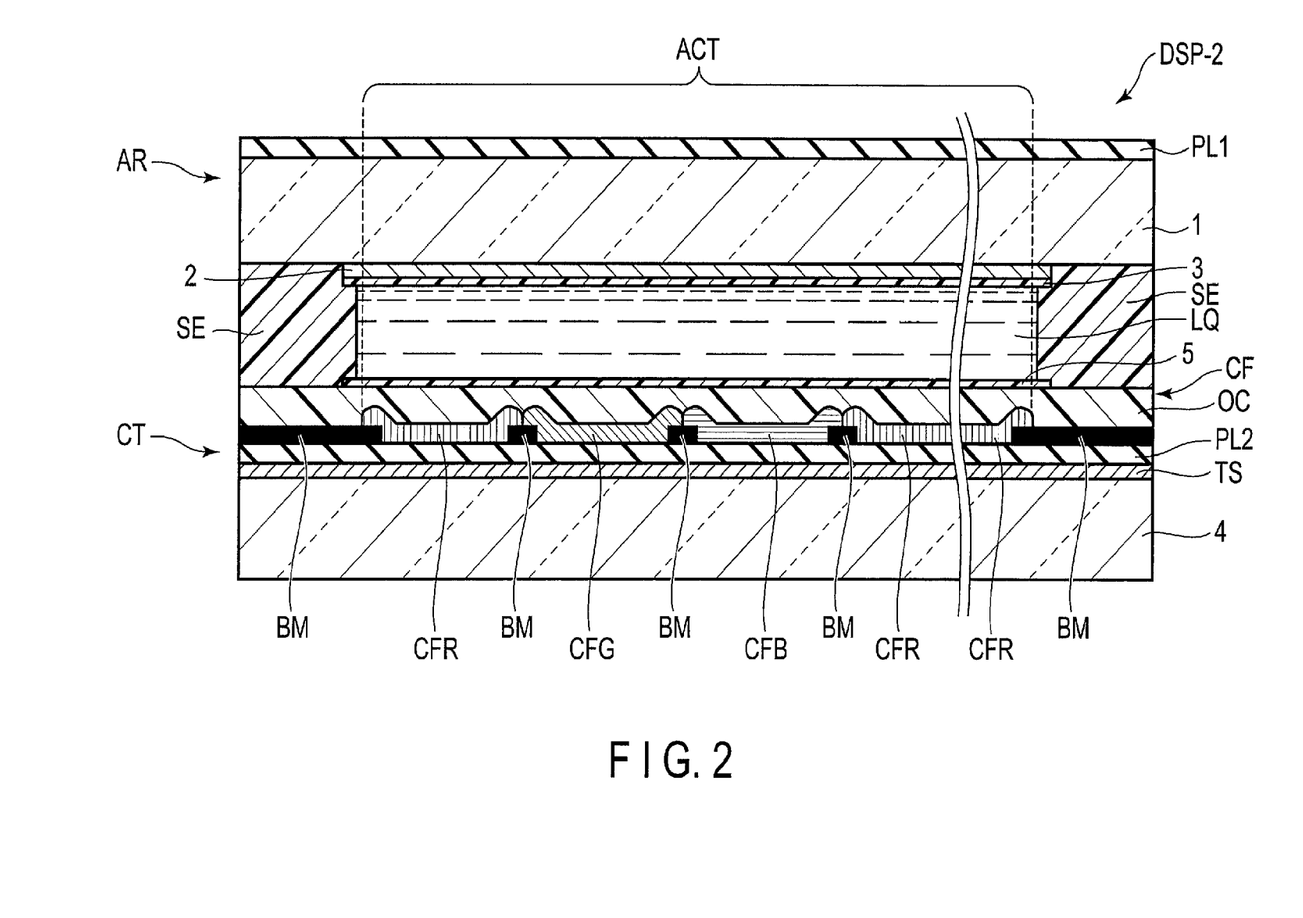
FIG. 2 is a partly omitted schematic cross-sectional view of a display device according to a second embodiment.

FIG. 2 is a partly omitted schematic cross-sectional view of a display device DSP-2 according to the second embodiment. The display device DSP-2 has basically the same structure as the display device DSP-1 according to the first embodiment except for a touch sensor TS as a detection electrode to detect a contact of an object on the surface of the display device DSP-2. The touch sensor TS is provided with the inner side surface of the second substrate 4. For example, in the touchpanel type display device DSP-2 of FIG. 2 includes a touch sensor TS disposed between the second substrate 4 and the second polarizer PL2. Although details of the touch sensor TS will be omitted here, the touch sensor TS may be of capacitance type which detects a change in the capacitance of sensing lines.

Third Embodiment

Figure 3:
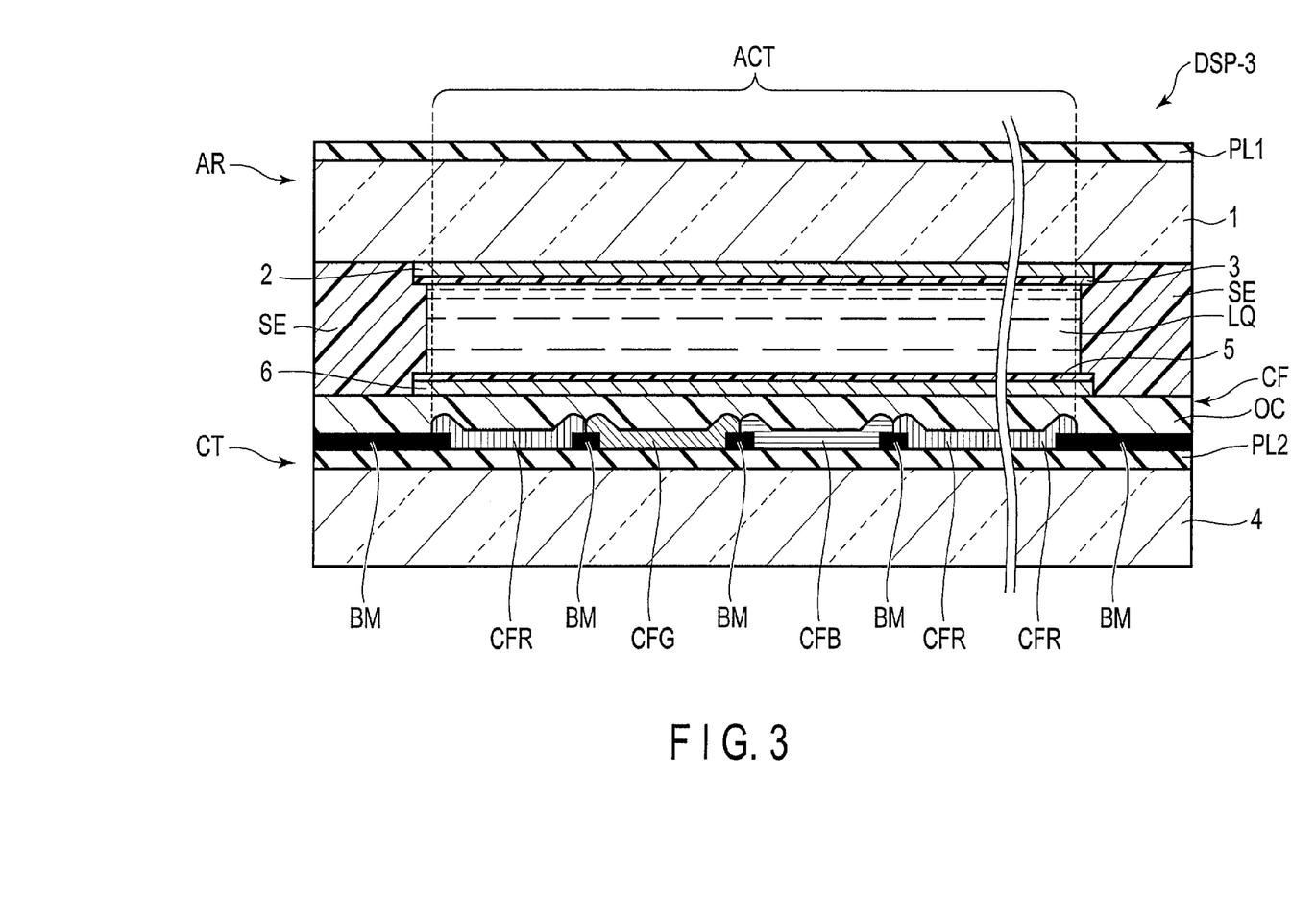
FIG. 3 is a partly omitted schematic cross-sectional view of a display device according to a third embodiment.

FIG. 3 is a partly omitted schematic cross-sectional view of a display device DSP-3 according to the third embodiment. The display device DSP-3 is an active matrix display device of vertical field drive mode. In the display device DSP-1 of horizontal field drive mode of FIG. 1, a counter electrode 6 is disposed in the array member AR side along with the pixel electrode. The counter electrode 6 is disposed on the overcoat layer OC in the counter member CT to be opposed to a plurality of pixel electrodes in the pixel circuit layer 2. More specifically, the counter electrode 6 is disposed between the color filter CF and the second alignment film 5. Except for this point, the display device DSP-3 is structured the same as the display device DSP-1 according to the first embodiment.

Fourth Embodiment

Figure 4:
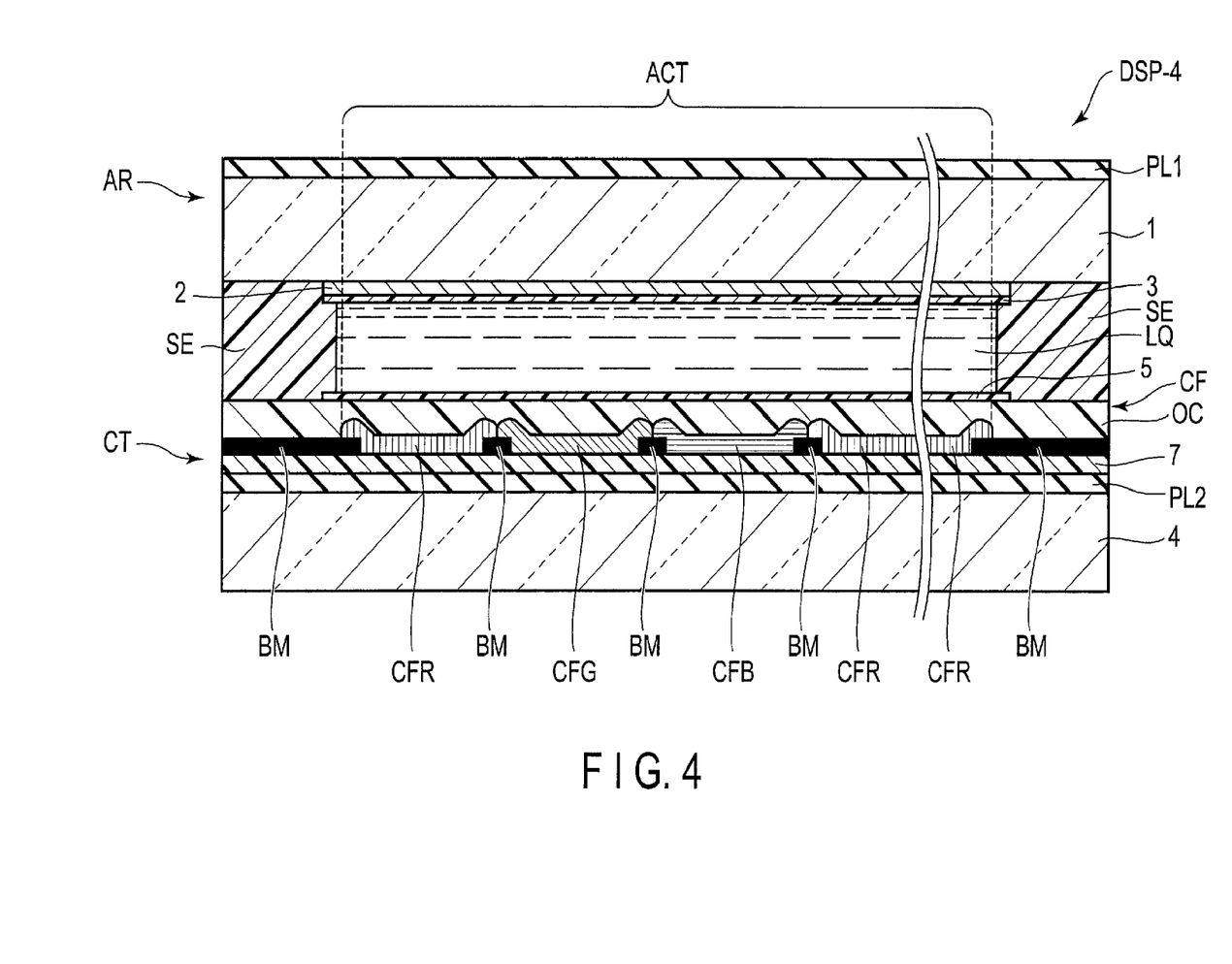
FIG. 4 is a partly omitted schematic cross-sectional view of a display device according to a fourth embodiment.

FIG. 4 is a partly omitted schematic cross-sectional view of a display device DSP-4 according to the fourth embodiment. The display device DSP-4 has basically the same structure as the display device DSP-1 according to the first embodiment except for an organic layer 7 disposed between the second polarizer PL2 on the surface of the second substrate 4 and the color filter CF.

The organic layer 7 is formed of, preferably, a polyimide resin. The organic layer 7 can be formed by, for example, a spin-coating method, flexography method, or slitcoating method.

When some substrates and films are laminated, the substrate takes place a distortion by difference of influence rate for the substrates and films due to heat or the like applied thereto during the manufacturing method, thereby generating a stress over the display device. The stress causes deteriorates of the display quality such as unevenness in the displayed image or misalignment in the pixels. The organic layer 7 functions as a stress adjusting layer which adjusts the stress to the whole layered structure by suppressing or reducing the stress produced therein. Therefore, the display device DSP-4 can prevent deterioration of the display quality such as unevenness in the displayed image and misalignment in the pixels caused by the stress, and can achieve desired optical performance. The organic layer 7 may function as an adhesive agent to adhere the layer components above and below thereof. Furthermore, the organic layer 7 may function as a parting agent which detaches a provisional substrate in the manufacturing process of the display device as described later.

The thickness of the organic layer 7 can be adjusted on the basis of factors such as desired performance, and a size of the display device to which the organic layer 7 is applied, and in this example, the thickness of the organic layer 7 is, preferably, 0.5 to 20 µm, or more preferably, 1 to 10 µm.

The display device DSP-4 according to the fourth embodiment can achieve the advantages obtained by the display device DSP-1 according to the first embodiment similarly, and also achieve more desirable optical performance by the organic layer 7 which functions as a stress adjusting layer preventing the deterioration of the display quality such as unevenness in the displayed image or the misalignment in the pixels caused by the stress.

Fifth Embodiment

Figure 5:
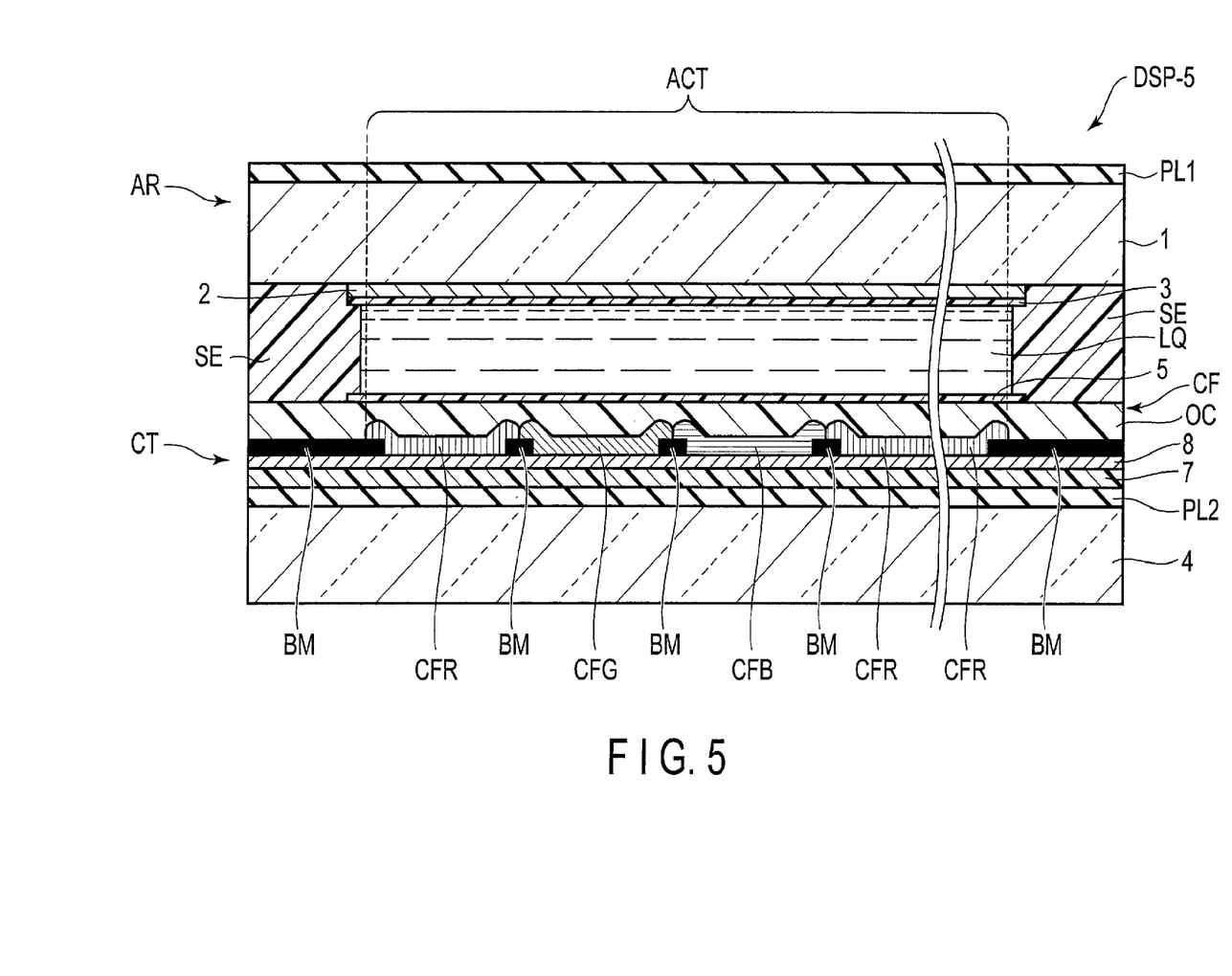
FIG. 5 is a partly omitted schematic cross-sectional view of a display device according to a fifth embodiment.

FIG. 5 is a partly omitted schematic cross-sectional view of a display device DSP-5 according to the fifth embodiment. The display device DSP-5 has basically the same structure as the display device DSP-4 of the fourth embodiment except for an inorganic layer 8 disposed between the organic layer 7 and the color filter CF.

The inorganic layer 8 functions as a barrier layer which blocks vapor, air, and ionic impurities from the first substrate 1. The inorganic layer 8 is, preferably, a SiO layer, $SiO_2$ layer, SiN layer, and SiO/SiN layer, for example. The inorganic layer 8 can be formed through, for example, sputtering or chemical vapor deposition (CVD).

The thickness of the inorganic layer 8 can be adjusted on the basis of factors such as a size of the display device to which the inorganic layer 8 is applied, and in this example, the thickness if the inorganic layer 8 is, for example, 0.1 to 5 µm.

The advantages obtained by the display device DSP-1 according to the first embodiment can be achieved similarly by the display device DSP-5 according to the fifth embodiment, and in addition thereto, the display device DSP-5 can achieve the following advantage.

Since the inorganic layer 8 functions as a barrier which blocks vapor, air, and ionic impurities from the second substrate 4, the inorganic layer 8 can prevent such impurities from entering the color filter CF and the like. As a result, the display device DSP-5 according to the fifth embodiment can achieve more desirable optical performance by preventing the deterioration of the display quality such as unevenness in the displayed image caused by impurities.

Sixth Embodiment

Figure 6:
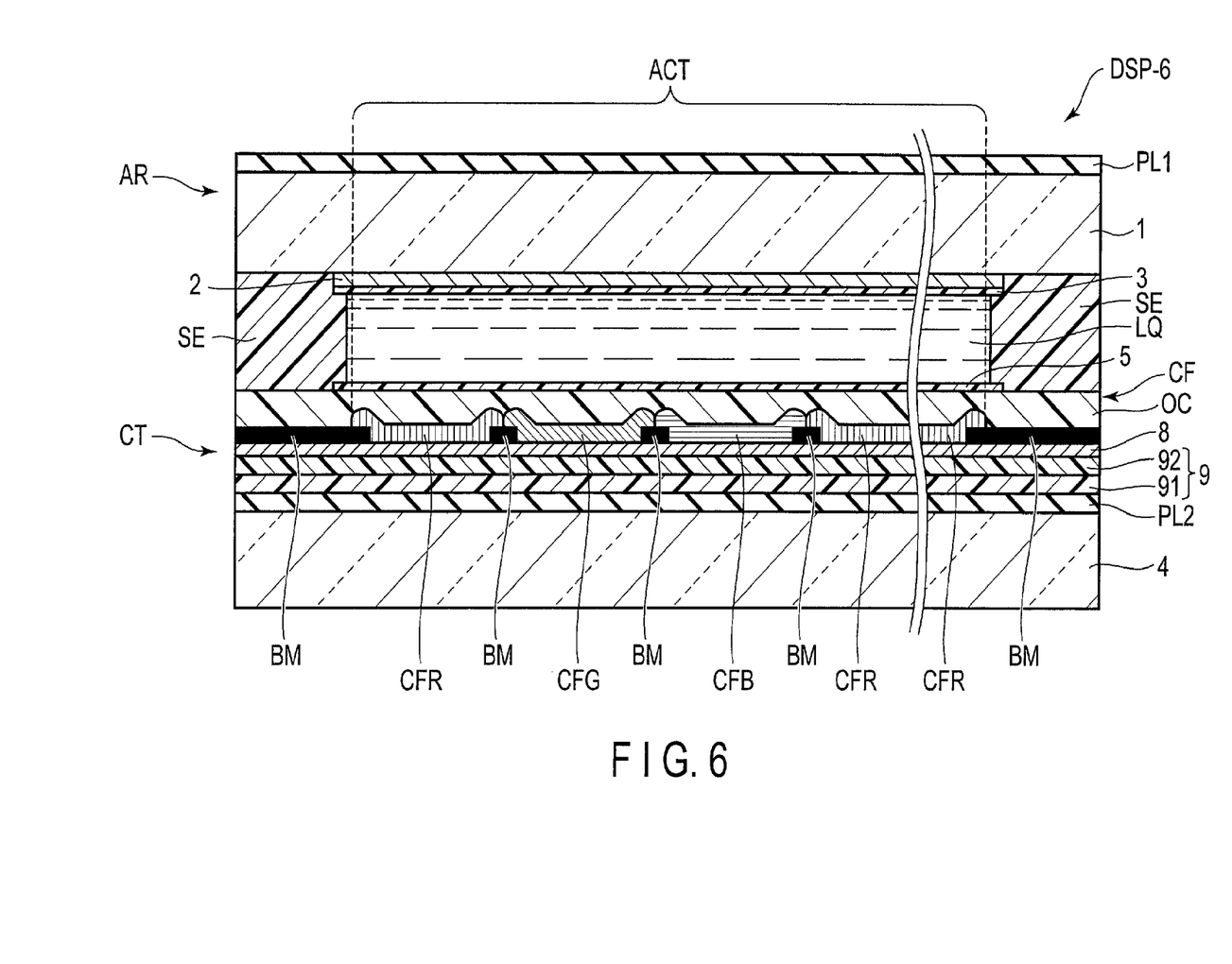
FIG. 6 is a partly omitted schematic cross-sectional view of a display device according to a sixth embodiment.

The display devices DSP-4 and DSP-5 according to the fourth and fifth embodiments include an organic layer 7 which is a monolayer; however, no limitation is intended thereby. The organic layer may be a multilayer. For example, in some cases, an additional organic layer may be disposed in the inner surface side of the organic layer 7. FIG. 6 is a partly omitted schematic cross-sectional view of a display device DSP-6 according to the sixth embodiment. The display device DSP-6 has basically the same structure as the display device DSP-5 according to the fifth embodiment except for an organic layer 9 which is a double layer disposed between the second polarizer PL2 and the inorganic layer 8. The double organic layer 9 includes a first organic layer 91 and a second organic layer 92.

The first organic layer 91 is disposed directly on the surface of the second polarizer PL2 in the liquid crystal layer LQ side. The first organic layer 91 is, preferably, formed of polyimide resin. The first organic layer 91 can be formed by, for example, a spin-coating method, flexography method, or slitcoating method. The first organic layer 91 functions as a stress adjusting layer which adjusts stress to the whole layered structure by suppressing or reducing the stress produced by warpage in the substrates therein. Therefore, the display device DSP-6 can prevent deterioration in the display quality such as unevenness in the displayed image and misalignment in the pixels caused by the stress, and can achieve desired optical performance. The first organic layer 91 may function as an adhesive agent to adhere the second polarizer PL2 and the second organic layer 92. Furthermore, the first organic layer 91 may function as a parting agent which detaches a provisional substrate in the manufacturing process of the display device as described later.

The second organic layer 92 is disposed between the first organic layer 91 and the inorganic layer 8. The second organic layer 92 is, preferably, formed of an acrylic resin.

The second organic layer 92 functions similarly to the first organic layer 91, that is, the second organic layer 92 functions as a stress adjusting layer which adjusts stress to the whole layered structure by suppressing or reducing the stress produced by warpage in the substrates therein. Therefore, the display device DSP-6 can prevent deterioration in the display quality such as unevenness in the displayed image and misalignment in the pixels caused by the stress, and can achieve desired optical performance.

If the first organic layer 91 is made of, for example, a polyimide resin, a phase difference caused by such a polyimide resin must be compensated. When the thickness of the first organic layer 91 increases, the phase difference increases and the degree of compensation of the phase difference also increases. In consideration of this point, the second organic layer 92 is formed of an acrylic resin which has a small in phase difference. Thereby, the thickness of the first organic layer 91 can be reduced while the internal stress can be suppressed sufficiently. The degree of compensation of the phase difference can be decreased.

The advantages obtained by the display device DSP-5 according to the fifth embodiment can be achieved similarly by the display device DSP-6 according to the sixth embodiment, and in addition thereto, the second organic layer 92 of the display device DSP-6 suppresses the internal stress and reduces the thickness of the first organic layer 91 to decrease the degree of compensation of the phase difference.

Note that, in the examples of the fourth, fifth, and sixth embodiments, the organic layer 7 or 9 and/or the inorganic layer 8 are deposed only in the counter member CT side of the display devices. However, such an organic layer and/or an inorganic layer may be disposed in the array member AR side. For example, such as organic layer and/or inorganic layer may be disposed between the pixel circuit layer 2 and the first substrate 1.

Note that, the display devices according to the above embodiments include a color filter for color image display. However, the display devices of the present application are not limited to those for color image display, and may be display devices for monochrome image display.

Now, a manufacturing method of a display device according to an embodiment will be explained.

(Preparation)

Initially, an array member AR is formed by an ordinary process.

Then, a provisional counter member is formed instead of a counter member CT. The provisional counter member is basically the same as the counter member CT except that a second polarizer PL2 (and touch sensor TS) are omitted and a provisional substrate is used instead of a second substrate 4. The provisional counter member is formed to include, on the provisional substrate, (1) a color filter CF and a second alignment film 5 (as in the first and second embodiments), or (2) color filter CF, counter electrode 6, and second alignment film 5 (as in the third embodiment), or (3) organic layer 7, color filter CF, and second alignment film 5 (as in the fourth embodiment), or (4) organic layer 7, inorganic layer 8, color filter CF, and second alignment film 5 (as in the fifth embodiment), or (5) organic layer 9, inorganic layer 8, color filter CF, and second alignment film 5 (as in the sixth embodiment). Note that the above components included in the provisional counter member may arbitrarily be changed depending on the structure of the display device to be manufactured. Note that, the color filter, layer, and film formed on the provisional substrate will be hereinafter referred to as a layered body.

Here, if the detachment of the provisional substrate is performed mechanically as described later, a parting agent layer can be formed on the provisional substrate before forming the layered body. Such a parting agent is formed of, for example, amorphous silicon.

The provisional substrate is, for example, an alkali-free glass substrate.

Figure 7:
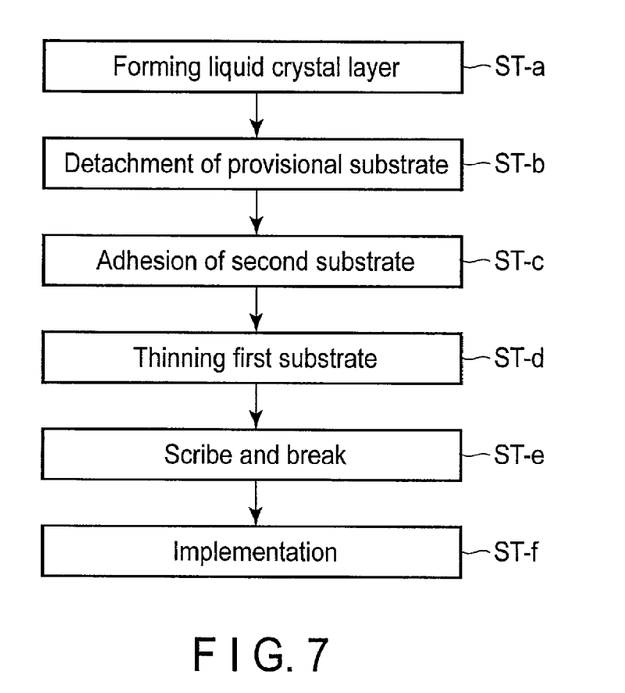
FIG. 7 is a flowchart of a manufacturing process of a display device according to an embodiment, showing steps after a liquid crystal layer formation process.

After preparing the array member AR and the provisional counter member as above, the manufacturing process proceeds as in the flowchart of FIG. 7 to manufacture the display devices in the first to sixth embodiments of FIGS. 1 to 6.

(Forming Liquid Crystal Layer)

The liquid crystal layer LQ is formed by injecting liquid crystal in the area surrounded by a sealing material SE between the array member AR and the provisional counter member (Step ST-a). The liquid crystal layer LQ is formed through a public knowledge method such as one drop filling (ODF).

In ODF, the sealing material SE is formed in a frame shape in a particular area on either one of the array member AR and the provisional counter member. Then, a liquid crystal material is dropped by a certain amount onto the part to which the sealing material SE is applied, and the array member AR and the provisional counter member are overlapped one upon another in a vacuum. Then, the sealing material SE is cured to fix the cell gap between the fitted parts. The cure adhesive process of the sealing material SE is determined on the basis of the sealing material SE used. For example, if the sealing material SE is of ultraviolet cure adhesive, the curing process is performed by irradiating ultraviolet to the sealing material SE. The structure obtained as above will be referred to as an overlapping structure.

(Detachment of Provisional Substrate)

Then, the provisional substrate is detached from the overlapping structure (Step ST-b). The provisional substrate may be detached by infrared irradiation or laser irradiation, or may be detached mechanically. For example, if the surface of the layered body to which the provisional substrate is attached is an organic polyimide layer, the attachment between the organic polyimide layer and the provisional substrate may be removed by ultraviolet irradiation thereto. Or, for example, if a parting agent is amorphous silicon, the provisional substrate may be mechanically detached. Through such a detachment process of the provisional substrate, the surface of the layered body is exposed.

(Adhesion of Second Substrate)

Then, the second substrate 4 is adhered on the exposed surface of the layered body (Step ST-c). In this step, a second polarizer PL2 is disposed on one surface of the second substrate 4 and a touch sensor TS may be provided below the second polarizer PL2, if necessary. The second substrate 4 is adhered such that the exposed surface thereof contacts the second polarizer PL2. The adhesion of the second substrate 4 is achieved arbitrarily with an optical clear adhesive (OCA) or an optical clear resin (OCR), for example. The adhesion of the second substrate 4 is achieved by a dam-and-fill method in which an adhesive agent is dropped on the layered body to surround the display area to form a dam and the inside of the dam is filled with a different adhesive agent.

(Thinning of First Substrate)

Then, the first substrate 1 is thinned (Step ST-d). The first substrate 1 is thinned by, for example, a chemical polishing method using hydrofluoric acid or the like or a mechanical polishing method using a polisher or the like.

(Scribe and Break Process)

Then, the layered body manufactured as above is divided into panels by a scribe and break method (Step ST-e).

(Implementation)

Lastly, a drive circuit and the like are implemented on each substrate to achieve a display device (Step ST-f).

In this process, the provisional substrate is formed instead of a second substrate 4. Thus, as compared to a case where a layered body is directly formed on a second substrate, warpage in the second substrate caused by heat or the like can be prevented, and deterioration in the display quality such as unevenness in the displayed image and misalignment in the pixels caused by the stress can be reduced.

Note that the manufacturing method of the display device is not limited to the above. A change in the above order of steps or an additional step to the above method may be adopted. For example, a step of thinning the first substrate is performed and then a step of thinning the array member and a scribe and break step are performed in the above manufacturing process; however, these steps may be switched, that is, the scribe and break step may be performed and then the step of thinning the first substrate may be performed. Furthermore, a step of dividing the layered bodies arranged on the provisional substrate into strips of certain numbers may be added after the step of forming the liquid crystal layer (a primal dividing step). If such a primal dividing step is performed, a process space can be maintained small in the latter steps.

As can be understood from the above, the present application can achieve thin display devices without loss of strength.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate including a pixel circuit;
a second substrate disposed opposite to the first substrate;
an optical element layer including liquid crystal material and disposed between the first substrate and the second substrate;
a polarizer disposed between the second substrate and the optical element layer;
an alignment film contacting the liquid crystal material and disposed on the second substrate; and
a polyimide layer between the alignment film and the second substrate;
wherein the second substrate has strength greater than that of the first substrate, and
an outer surface of the second substrate is an outermost surface of the display device on a viewing side of the display device.

2. The display device of claim 1, wherein the first substrate is an alkali-free glass substrate, and the second substrate is an alkali glass substrate or a sapphire substrate.

3. The display device of claim 1, wherein the first substrate has a thickness of less than 0.3 mm, and the second substrate has a thickness of 0.3 mm or more.

4. The display device of claim 1, wherein the polyimide layer is disposed between the polarizer and the optical element layer.

5. The display device of claim 4, wherein the polyimide layer has a thickness of 0.5 to 20 µm.

6. The display device of claim 4, wherein an inorganic layer is disposed between the polyimide layer and the optical element layer.

7. The display device of claim 4, wherein the polyimide layer includes a first organic layer and a second organic layer, and the first organic layer is disposed closer to the second substrate than the second organic layer.

8. The display device of claim 1, wherein a detection electrode is disposed between the second substrate and the polarizer.

9. The display device of claim 1, wherein the first substrate and the second substrate do not include any other substrate therebetween.

10. The display device of claim 1, further comprising:
a detection electrode between the second substrate and the polyimide layer.

11. A display device comprising:
a first substrate including a pixel circuit;
a second substrate disposed opposite to the first substrate;
an optical element layer disposed between the first substrate and the second substrate;
a polarizer disposed between the second substrate and the optical element layer;
a polyimide layer between the optical element layer and the second substrate; and
a detection electrode between the second substrate and the polyimide layer,
wherein the second substrate has strength greater than that of the first substrate, and
an outer surface of the second substrate is an outermost surface of the display device on a viewing side of the display device.

12. The display device of claim 11, wherein the first substrate is an alkali-free glass substrate, and the second substrate is an alkali glass substrate or a sapphire substrate.

13. The display device of claim 11, wherein the first substrate has a thickness of less than 0.3 mm, and the second substrate has a thickness of 0.3 mm or more.

14. The display device of claim 11, wherein the polyimide layer is disposed between the polarizer and the optical element layer.

15. The display device of claim 11, wherein an inorganic layer is disposed between the polyimide layer and the optical element layer.

16. The display device of claim 15, wherein the inorganic layer has a thickness of 0.1 to 5 µm.

17. The display device of claim 11, wherein the polyimide layer includes a first organic layer and a second organic layer, and the first organic layer is disposed closer to the second substrate than the second organic layer.

18. The display device of claim 11, wherein a detection electrode is disposed between the second substrate and the polarizer.

19. The display device of claim 11, wherein the first substrate and the second substrate do not include any other substrate therebetween.

* * * * *